R. R. HUGHES, Jr.
STITCH FORMING MECHANISM FOR SEWING MACHINES.
APPLICATION FILED OCT. 23, 1916.
1,326,593.
Patented Dec. 30, 1919.
5 SHEETS—SHEET 1.
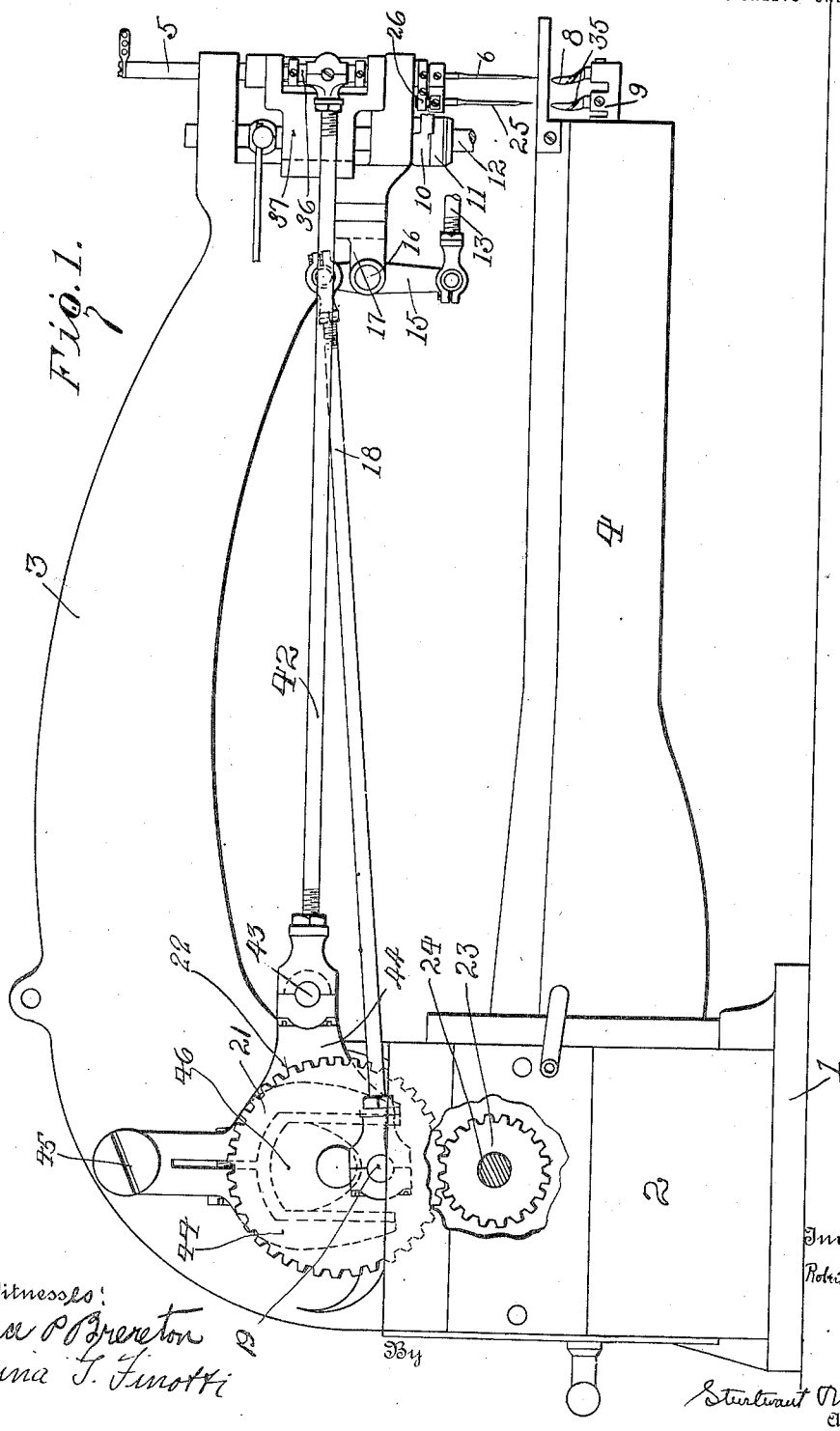

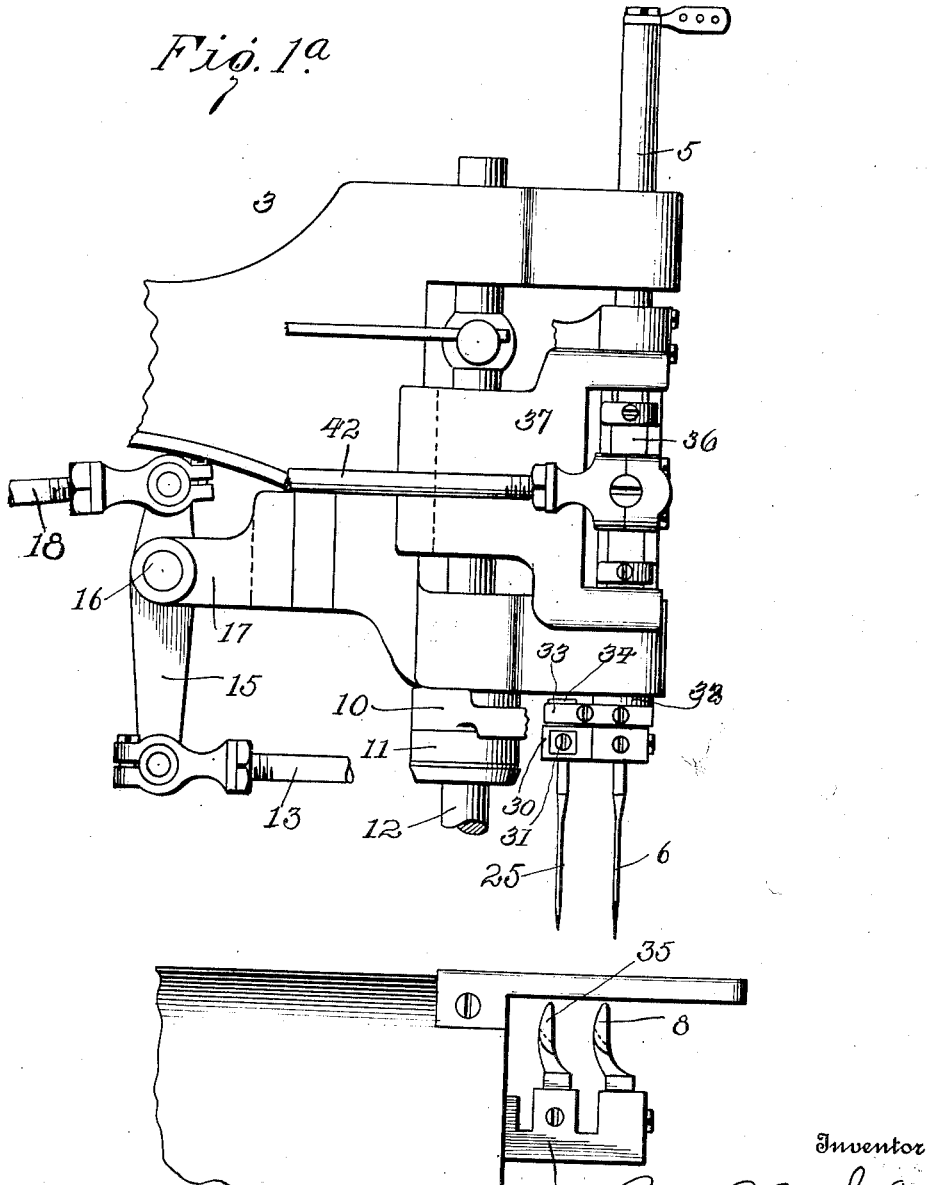

R. R. HUGHES, Jr.
STITCH FORMING MECHANISM FOR SEWING MACHINES.
APPLICATION FILED OCT. 23, 1916.
1,326,593.
Patented Dec. 30, 1919.
5 SHEETS—SHEET 3.
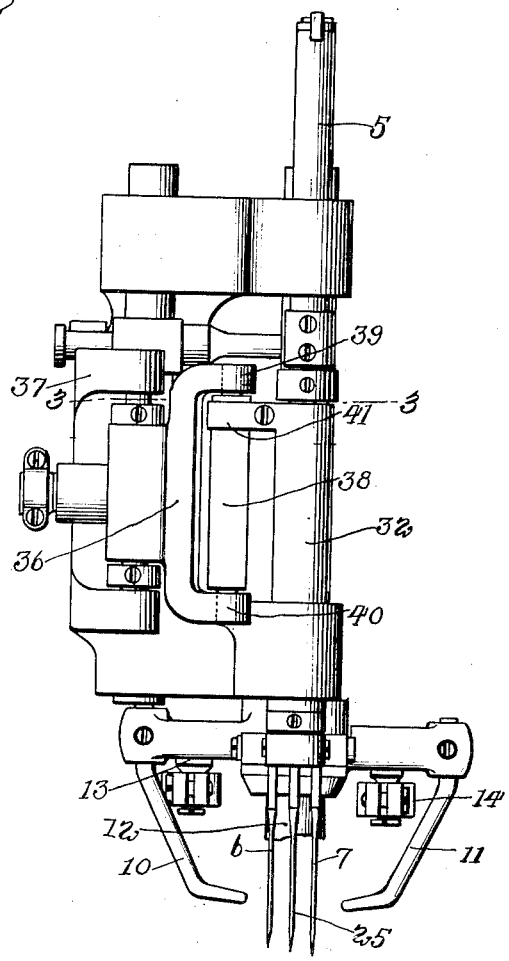
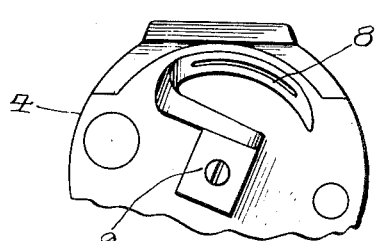

R. R. HUGHES, Jr.
STITCH FORMING MECHANISM FOR SEWING MACHINES.
APPLICATION FILED OCT. 23, 1916.
1,326,593.
Patented Dec. 30, 1919.
5 SHEETS—SHEET 4.
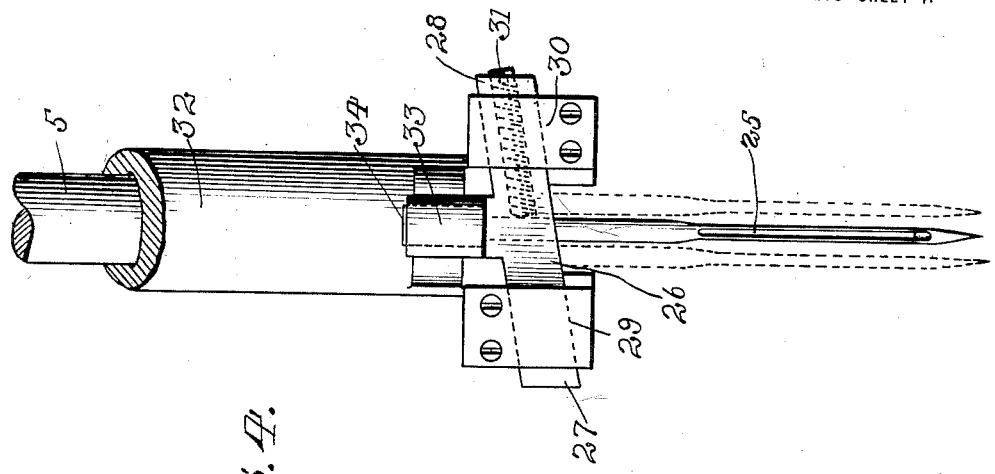
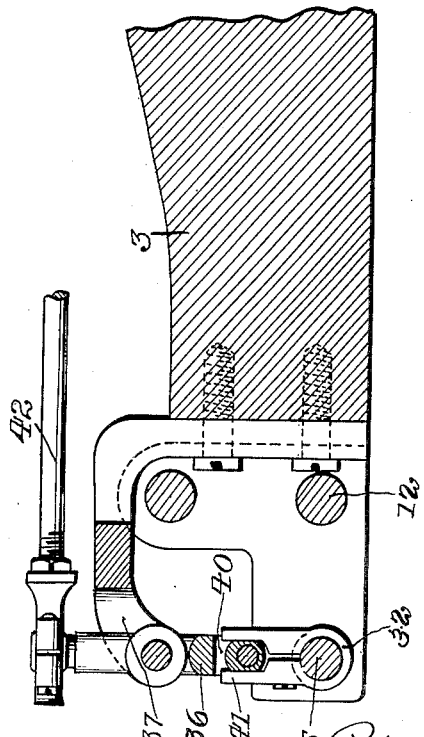

R. R. HUGHES, Jr.
STITCH FORMING MECHANISM FOR SEWING MACHINES.
APPLICATION FILED OCT. 23, 1916.
1,326,593.
Patented Dec. 30, 1919.
5 SHEETS—SHEET 5.
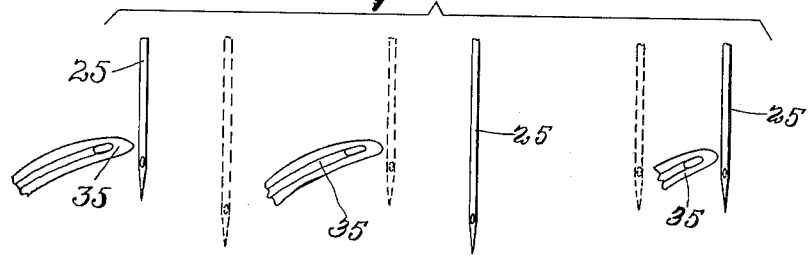
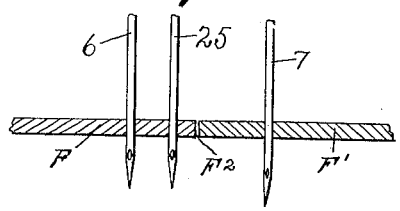
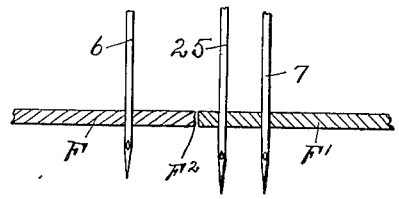
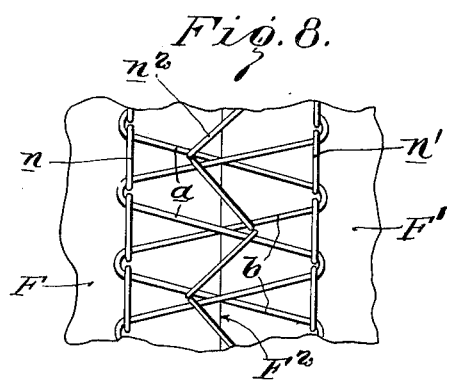
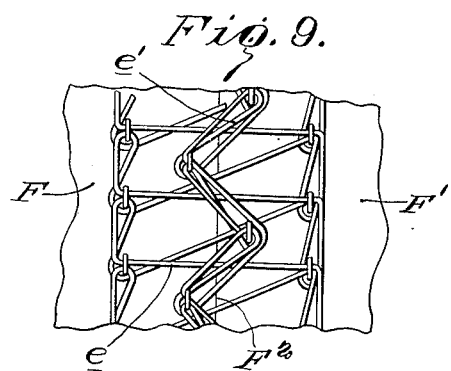
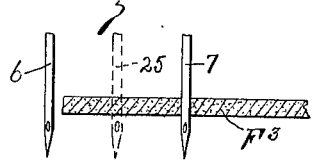
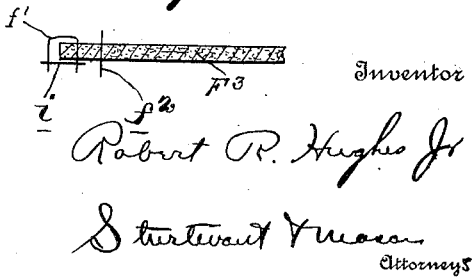

UNITED STATES PATENT OFFICE.

ROBERT R. HUGHES, JR., OF UTICA, NEW YORK, ASSIGNOR TO UNION SPECIAL MACHINE COMPANY, OF CHICAGO, ILLINOIS, A CORPORATION OF ILLINOIS.

STITCH-FORMING MECHANISM FOR SEWING-MACHINES.

1,326,593.  Specification of Letters Patent.  Patented Dec. 30, 1919.

Application filed October 23, 1916. Serial No. 127,211.

*To all whom it may concern:*

Be it known that I, ROBERT R. HUGHES, Jr., a citizen of the United States, residing at Utica, in the county of Oneida, State of New York, have invented certain new and useful Improvements in Stitch-Forming Mechanism for Sewing-Machines, of which the following is a description, reference being had to the accompaying drawing and to the figures of reference marked thereon.

The invention relates to new and useful improvements in stitch forming mechanisms for sewing machines, and more particularly to a stitch forming mechanism for forming a flat seam, that is, a seam wherein the edges of the material are abutted or slightly overlapped and joined solely by the stitching threads.

An object of the invention is to provide a stitch forming mechanism of the above character wherein the needle threads for covering the edges of the material are laid by a laterally vibrating needle.

A further object of the invention is to provide a stitch forming mechanism wherein the vertical reciprocating position of the laterally vibrating needle is varied in order to insure the looper entering the needle loop in both extreme positions of the needle.

These and other objects will in part be obvious and will in part be hereinafter more fully disclosed.

In the drawings, which show by way of illustration one embodiment of the invention:—

Figure 1 is a rear view of a portion of a sewing machine having my improved stitch forming mechanism applied thereto;

Fig. 1ª is an enlarged rear view of the end of the work support and the overhanging arm;

Fig. 2 is an end view of the end of the overhanging arm, showing the parts carried thereby, and also showing a portion of the work support and one of the loopers;

Fig. 3 is a sectional view on the line 3—3 of Fig. 2, the thread laying devices and the work support being omitted;

Fig. 4 is a rear view of the needle bar, a sleeve supported thereby, and the supporting head for the laterally vibrating needle;

Fig. 5 is a diagrammatic view showing several positions of the laterally vibrated needle and the looper which coöperates therewith;

Fig. 6 is a view showing, more or less diagrammatically, the relative positions of the needles and the fabric sections when the needles are at the lower end of their stroke;

Fig. 7 is a similar view, showing another position of the needles when at the lower end of their stroke;

Fig. 8 is a plan view showing on an enlarged scale two fabric sections joined by my improved stitching mechanism;

Fig. 9 is a bottom plan view of the seam shown in Fig. 8;

Fig. 10 is a diagrammatic view showing a slightly modified form of arrangement of the needles; and Fig. 11 is a diagrammatic view showing a seam stitched on the arrangement of needles shown in Fig. 10.

The invention is embodied in a sewing machine having a work support and an overhanging arm carrying a needle bar on which the needles are mounted. In my preferred arrangement of the invention, the needle bar is provided with a pair of needles arranged in a line at right angles to the feed and a single looper coöperates with the needles. In rear of a plane containing the pair of needles, there is a single needle which is vibrated laterally. Said vibrated needle has its limits of vibration within the needles of the front pair and a single looper coöperates with this laterally vibrated needle. In order that the needle may be vibrated through a considerable range of movement without throwing the same out of the proper timing with the looper, the vertically reciprocating position of the needle is varied, and this changes the timing of the needle sufficiently to bring it into the proper coöperative relation with the looper so that the looper will with certainty enter the needle loop at both extreme positions of the laterally vibrated needle.

Referring more in detail to the drawings:—

The invention is shown as applied to a sewing machine having a supporting bed 1 which carries a standard 2 having an overhanging arm 3. A cylindrical work supporting arm 4 projects from the standard. A needle bar 5 is mounted in the overhanging arm 3, and said needle bar is reciprocated in any suitable way. This needle bar is provided with a pair of needles 6 and 7. These needles are arranged in a line which is at right angles to the line of feed or at right angles to the longitudinal axis of the cylindrical work supporting arm, the direction of feed preferably being longitudinally of the arm and on to the arm. Coöperating with the needles 6 and 7 is a looper 8 mounted on the looper carrier 9 which is oscillated to give a loop taking and loop shedding movement to the looper and this looper carrier is moved endwise for giving to the looper its needle avoiding movement.

Coöperating with this pair of needles is a pair of thread laying fingers 10 and 11. These fingers 10 and 11 are mounted on the presser bar 12 so as to swing freely thereon. A link 13 is connected to the arm which supports the thread laying finger 10 and a link 14 is connected to the arm which supports the thread laying finger 11. These links 13 and 14 are connected to a lever 15 which is pivoted at 16 to a bracket 17 carried by the overhanging arm. Said lever 15 is in turn pivoted to a link 18. The link 18 is connected to a ball stud 19 eccentrically mounted on a disk 21 which is provided with gear wheel 22. This gear wheel meshes with a gear wheel 23 on the cross shaft 24 which may be the main shaft of the machine. The gear wheels 23 and 22 are so proportioned that the gear wheel 22 will have one rotation to two rotations of the main shaft and, therefore, the thread laying fingers 10 and 11 will move in one direction for each complete reciprocation of the needle bar, and then in the other direction for the next complete reciprocation of the needle bar.

Mounted on the needle bar is a third needle 25. This needle is mounted for lateral vibration, said needle being vibrated back and forth in a plane parallel with a plane containing the needles 6 and 7. The needle 25 is carried by a needle head 26 which has laterally projecting arms 27 and 28. The arms 27 and 28 are inclined to a horizontal, and these arms are adapted to slide in guideways formed in brackets 29 and 30 respectively. The needle is clamped to the needle head 26 by a clamping screw 31.

Mounted on the needle bar is a sleeve 32. This sleeve 32 carries a rearwardly projecting arm 33 at its lower end which embraces a stud 34 on the needle head 26 so that, as the sleeve 32 is oscillated the needle head will slide back and forth in its bearings and the movement of the needle head in the bearings not only shifts the needle from one lateral position to the other, but changes the vertical reciprocating position of the needle. In other words, the needle bar has a fixed field of reciprocation and, when the needle is shifted laterally, it is moved relative to the needle bar both laterally and vertically so that the needle will descend to a greater distance in one position than in another.

In Fig. 5 of the drawings, I have shown, more or less diagrammatically, several positions of the needle 25 and the looper 35 which coöperates therewith. This looper 35 is mounted on the looper carrier and has the same movements as the looper 8, as above described. In the left hand view in Fig. 5, the needle is shown in full lines at the lower end of its stroke and the looper 35 just about to enter the needle loop thrown out by the needle. In the dotted line position, the needle is shown as being moved laterally to its full extent and at the lower end of its stroke. It will be apparent that the needle is at this stroke moving downward to a greater distance than when in the full line stroke. The view shown in Fig. 4 is a rear view which accounts for the right hand position of the needle being higher than the left hand position. In the central view in Fig. 5, the needle is shown in full lines in the right hand position and in dotted lines in its left hand position.

When the needle has moved to the lower end of its stroke, the looper has moved forward to a point where it would properly coöperate with the needle in its dotted line position that is, the lower end of its left hand stroke. When the looper is moving from the central position in Fig. 5 to the right hand position shown therein, the needle has moved up until its point is in line with the point where the needle stood when at the left hand vibration, and in this position of the needle it is now timed so that the looper which has just reached the needle will enter its loop without skipping stitches. In other words, by varying the vertical reciprocating position of the needle, I am able to delay the time when the eye of the needle is a certain distance beneath the work support on the right hand stroke so as to give the looper sufficient time to cross the distance which the needle vibrates laterally and to come into proper coöperative position relative to the needle.

The sleeve 32 is oscillated on the needle bar by means of a vibrating gate 36. This vibrating gate 36 is mounted in a bracket 37. Said vibrating gate carries a bar 38 which is pivotally supported by the arms 39 and 40 of the gate. The sleeve 32 has a rearwardly projecting forked arm 41 which is adapted to slide on the bar 38. The gate 36 is oscillated by means of a link 42. The link 42 is pivoted at 43 to a forked arm 44 which is in turn pivoted at 45 to the overhanging arm 3 of the machine. The disk 19 is mounted on a short stub shaft which carries a cam 46, and this cam works in the forked arm 44 and oscillates the same. Inasmuch as the shaft carrying this cam 46 has one revolution to every two revolutions of the main shaft 24, the needle will be vibrated laterally in one direction for one complete reciprocation of the needle bar, and then vibrated laterally in the other direction for the next complete reciprocation of the needle bar. The cam 46 is so shaped and timed as to move the needle laterally when it is above the material.

In Figs. 8 and 9 of the drawings, I have shown a flat seam stitched by my improved stitching mechanism, and this flat seam consists of two fabric sections F and F' which have their abutted edges meeting at $F^2$. The needle thread of the needle 6 is indicated at $n$, while the needle thread of the needle 7 is indicated at $n'$. The looper thread of the looper 8 is indicated at $e$, while the threads laid by the fingers 10 and 11 are indicated at $a$ and $b$. In these figures of the drawings, the thread of the needle 25 is indicated at $n^2$, and the looper thread of the looper 35 is indicated at $e'$. It will be apparent from these figures of the drawings that the two needles 6 and 7 form parallel rows of needle loops which pass through the respective sections of the fabric, and the looper thread concatenates with these needle loops beneath the material. The needle threads are joined on the upper face of the fabric by the cross threads $a$ and $b$. The needle 25 is vibrated back and forth across the abutted edges of the fabric so as to enter first one edge of the fabric and then the other, and, therefore, the needle thread on top of the fabric sections and the looper thread below the fabric sections cover the meeting edges of the fabric sections and bind down the cross threads $a$ and $b$, and also the cross looper thread $e$. By my improved arrangement, wherein the needle has different vertical reciprocating positions so as to always maintain its proper coöperative position with the looper, I am able to vibrate the needle to a considerable extent so that the needle loops formed thereby will penetrate the fabric sections a sufficient distance back from the meeting edges so that they will be well covered.

In Fig. 6 of the drawings, I have shown the relative positions of the needles when the needle 25 is entering the fabric on one side of its meeting edges, while in Fig. 7 I have shown the positions of the needles when the needle 25 is entering the fabric sections on the other side of the meeting edges.

In Figs. 10 and 11 of the drawings, I have shown a slightly modified arrangement in that the needle 6 has been removed from the needle bar and the needle 7 forms a straight line of stitching. The fabric, indicated at $F^3$ is guided to the needles so that the laterally vibrating needle 25 forms over-edge stitches which are indicated at $f'$. The straight line of stitching in Fig. 11 is indicated at $f^2$. The looper thread for the needle 25 is indicated at $l'$ in Fig. 11.

It will be obvious that other arrangements of needles may be made without departing from the spirit of this invention, and it will also be obvious that the laterally vibrating needle may be used by itself where it is desired to give considerable lateral movement to the needle and still avoid the skipping of stitches.

Having thus described the invention, what is claimed as new is:—

1. The combination of a work support, a needle, means for vibrating said needle laterally, a looper coöperating with the needle, a needle located in a fixed vertical line and in a plane in front of the plane of the vibrating needle and at one side thereof, and a looper coöperating therewith.

2. The combination of a work support, a needle, means for vibrating the needle laterally, a looper coöperating with said needle, a pair of needles located in a plane in front of said laterally vibrating needle, and a looper coöperating with said pair of needles.

3. The combination of a work support, a needle, means for vibrating the needle laterally, a looper coöperating with said needle, a pair of needles located in a plane in front of said laterally vibrating needle, and a looper coöperating with said pair of needles, said pair of needles being spaced a greater distance apart than the lateral vibration of the needle in rear thereof, and said laterally vibrating needle being centrally disposed between said pair of needles.

4. The combination of a work support, a needle, a looper coöperating with said needle, means for vibrating said needle laterally and for changing the vertical reciprocating position of the needle to maintain the coöperation of the looper and the needle in both extreme positions of the needle, a pair of needles located in a plane in advance of said laterally vibrating needle, and a looper coöperating with said laterally vibrating needle.

5. The combination of a work support, a needle, means for vibrating the needle laterally and for changing its vertical reciprocating position, a looper coöperating with said needle, means for vibrating said needle laterally and for changing the vertical reciprocating position of the needle to maintain the coöperation of the looper and the needle in both extreme positions of the needle, a pair of needles located in a plane in front of said laterally vibrating needle, and a looper coöperating with said laterally vibrating needle, said pair of needles being spaced a greater distance than the lateral vibration of the needle, and said laterally vibrating needle being centrally disposed between the pair of needles.

6. The combination with a work support, of a vertically reciprocatory needle, means for vibrating the needle laterally, a pair of vertically reciprocatory needles, each being reciprocated in a fixed vertical line, means for simultaneously reciprocating all of said needles, and loopers coöperating with said needles.

7. The combination of a work support, a needle, a looper coöperating therewith, a needle bar, means for supporting said needle on said needle bar whereby said needle may be moved laterally of the needle bar, said supporting means being constructed to shift the vertical position of the needle when it is moved laterally.

8. The combination of a work support, a needle, a looper coöperating therewith, a needle bar, a laterally sliding head carried by said needle bar on which said needle is mounted, said sliding head having inclined arms whereby the lateral movement of the needle changes the vertical reciprocating position thereof, and means for sliding said head on the needle bar.

9. The combination of a work support, a needle, a looper coöperating therewith, a needle bar, a laterally sliding head carried by said needle bar on which said needle is mounted, said sliding head having inclined arms whereby the lateral movement of the needle changes the vertical reciprocating position thereof, a sleeve on said needle bar, an arm carried by the sleeve for sliding the head on the needle bar, and means for oscillating the sleeve.

10. The combination of a work support, a needle, a looper coöperating therewith, a needle bar, a laterally sliding head carried by said needle bar on which said needle is mounted, said sliding head having inclined arms whereby the lateral movement of the needle changes the vertical reciprocating position thereof, a sleeve on said needle bar, an arm carried by the sleeve for sliding the head on the needle bar, a swinging gate having a vertical bar, a forked arm carried by the sleeve and engaging said bar whereby the oscillations of the gate will shift the lateral position of the needle.

In testimony whereof, I affix my signature in the presence of two witnesses.

ROBERT R. HUGHES, Jr.

Witnesses:
A. J. BAECHLE,
A. L. WILCOX.